United States Patent

Law

[15] 3,674,818
[45] July 4, 1972

[54] SYNTHESIS OF A MATERIAL WITH JUVENILE HORMONE ACTIVITY

[72] Inventor: John H. Law, Chicago, Ill.
[73] Assignee: The United States of America as represented by the Secretary of the Department of Health, Education and Welfare
[22] Filed: Dec. 5, 1969
[21] Appl. No.: 878,990

Related U.S. Application Data

[63] Continuation of Ser. No. 626,677, March 29, 1967, abandoned.

[52] U.S. Cl.............................................260/408, 424/312
[51] Int. Cl..........................................................C11c 3/00
[58] Field of Search..................................................260/408

[56] References Cited

UNITED STATES PATENTS 3,154,570  10/1964  Adami et al. ........................260/410.5
2,766,273  10/1956  Bruins et al............................260/484
2,383,601  8/1945   Keim ..................................260/419.9

OTHER PUBLICATIONS

Vogel, " A Textbook of Practical Organic Chemistry," pp. 374, 377, Longmans Green & Co., N.Y., 1948
Law et al., " Synthesis of a Material With High Juvenile Hormone Activity," Proc. of the National Academy of Sciences, Vol. 55, pp. 576–578, Mar. 1966

Primary Examiner—Lewis Gotts
Assistant Examiner—Catherine L. Mills
Attorney—John C. Holman, Marvin R. Stern and Jacobi and Davidson

[57] ABSTRACT

Synthesis of a material with juvenile hormone activity by reacting crude or purified farnesoic acid with alcoholic hydrogen chloride wherein the alcohol is selected from the group consisting of ethanol, methanol, n-propanol and n-pentanol. Various comparisons are shown with other related compounds and an exemplary list of insects sensitive to the material is set forth.

6 Claims, No Drawings

SYNTHESIS OF A MATERIAL WITH JUVENILE HORMONE ACTIVITY

This application is a continuation of Ser. No. 626,677, filed Mar. 29, 1967, now abandoned.

This invention relates to the synthesis of a material having juvenile hormone activity and relates more particularly to the production of a compound useful as a "biological" insecticide or ovicide.

Various techniques are known for controlling insects which are harmful, directly or indirectly, to man. Most insecticides are materials which are toxic to insects and which function according to one of several techniques to chemically poison insects. Certain insecticides act as stomach poisons for insects which eat plant leaves or the like, such as, for example, lead arsenate, sodium fluoride or the sodium fluosilicates. Other insecticides are contact poisons applied directly to the body of the insect either by treating the material with which an insect comes into contact or by introducing the toxic agent as a fumigant into the air the insect breathes. Examples of contact poisons are pyrethrum, DDT, chlordane and parathion. Fumigants include such materials as hydrocyanic acid gas, paradichlorobenzene and methyl bromide. A third category of insecticides are the systemic insecticides in which the toxic agent is made a component of the plant itself, that is, the material is more toxic to insects after it has been absorbed into the leaves of a plant than it is as a direct poison. An example of a systemic insecticide is octamethylphosphoramide. All of the aforementioned materials are well known and the above list is merely set forth as exemplary of numerous chemical compounds which function as chemical poisons for insects. Similarly, many chemical compounds are readily available which function as insect ovicides.

Although materials of the type described above are commonly in use, they suffer from one or more common disadvantages. For example, it is common knowledge that strains of insects have evolved which are resistant to particular insecticides. Additionally, some of these materials may be toxic to man, particularly if they are utilized improperly and, further, especially in view of their large scale employment.

It is therefore obviously desirable to have a material which avoids the aforesaid and other such disadvantages common to conventional insecticides and ovicides. For this reason, great interest has been recently evidenced in material which might be termed "biological" insecticides and ovicides, that is, materials which function to control harmful insects by affecting their biological development, rather than by acting as chemical poisons. Perhaps the best known material of this type is juvenile hormone, a hormone which is secreted by certain glands in the insect and which is necessary to the proper growth of the insect during certain periods of its development. However, the presence of juvenile hormone at other developmental stages is found to inhibit natural metamorphosis, resulting in the death of the insect before reaching sexual maturity.

Active extracts of juvenile hormone from male moths of the silkworm *Hyalophora* (*Platysamia*) *cecropia* have been prepared. *Cecropia* oil, as this material is referred to, has been utilized to block development of metamorphosing silkworm pupae by topical application. However, isolation and identification of the active material in the *cecropia* extract has not yet been successfully accomplished.

Following the initial isolation of *cecropia* oil, various synthetic materials have been found to have juvenile hormone activity. Among these materials is the sesquiterpene alcohol, farnesol and the corresponding aldehyde, farnesal as well as the more hormonally active compounds, farnesyl methyl ether and farnesyl diethylamine. The testing of the geometric isomers of farnesol shows that only the trans, trans- and the 2-cis,6-trans isomers have significant juvenile hormone activity.[1]
([1] Yamamoto et al. "Nature," 196, 908 (1962))

Assays performed on pupae of the bee moth (*Galleria melonella*) and the silkworm (*Antheraea polyphemus*) have shown that farnesyl methyl ether and farnesyl diethylamine are approximately as active as the crude *cecropia* extract whereas highly purified preparations of farnesol were only 15 percent as active.[2] ([2] Schneiderman et al., "Science," 143, 325 (1964).) The significance of these findings becomes readily apparent when it is recognized that the active material in *cecropia* oil can be concentrated 300,000-fold without obtaining a pure substance. Thus, it will be seen that the hormonal activity of the aforementioned farnesol derivatives, when assayed on Lepidoptera, is far less than that of the active substance in the *cecropia* extract.

In view of the above background, it is a primary object of this invention to provide for the production of a material with juvenile hormone activity, not only for Lepidoptera, but also for nearly all orders of insects. Further, it is an objective of this invention to provide a technique for the synthesis of such a material which is simple and relatively inexpensive, and yet, one which is highly efficient and readily reproduced.

Once again, considering the foregoing, it is a basic object to provide a method for producing a juvenile hormone analogue which is active to block metamorphosis in insects while apparently being inactive for other forms of life. Additionally, this invention provides, as an important objective, a technique for the production of a material which is extremely effective as an ovicide, that is, a material which can penetrate insect eggs and act on the embryo therewithin to block development of the same so that the eggs do not hatch.

Thus, the instant inventive concepts provide for the synthesis of a hormonally active material which functions to hinder embryonic development and normal metamorphosis, steps which ordinarily occur in the absence of juvenile hormone.

The basic objectives of this invention are realized by reacting farnesoic acid with hydrogen chloride gas in the presence of an alcohol, specifically, methanol, ethanol, n-propanol and n-pentanol. Preferred procedures for this synthesis as well as various comparative test results and techniques for using the material synthesized according to this invention will be seen from the following examples.

EXAMPLE 1

Crude farnesoic acid was obtained by the oxidation of commercial farnesol according to the procedure described by Childs and Bloch.[3] ([3] "J. Biol. Chem." 237, 62 (1962)) The synthetic products were converted to methyl esters by treatment with a diethyl ether solution of diazomethane (generated from "Methyl Diazald", Aldrich Chemical) and chromatographically examined.[4] ([4] Popjak et al. "J. Chromatog.," 4, 214, (1960)) Trans,trans-farnesoic acid and cis,trans-farnesoic acid accounted for less than 70 percent of the total weight with at least four other unidentified compounds being present.

One gram of this crude farnesoic acid was dissolved in 100 ml absolute ethanol, placed in a round-bottom flask, and chilled to 0° C. in an ice bath. A stream of hydrogen chloride was passed through the solution for 5 minutes. The flask was stoppered, returned to room temperature for 12 hours, and then placed on a rotary evaporator to eliminate the solvent in vacuo with the temperature gradually rising to 50° C. With small volumes of benzene, the material was rinsed into a separatory funnel and washed with water to remove residual traces of hydrogen chloride. The benzene phase was collected and reduced to dryness to obtain a colorless oil of low viscosity, wt. ca. 1 gram.

Samples of this crude synthetic product show high juvenile hormone activity when dissolved in propylene glycol and injected into previously chilled pupae of the *polyphemus* silkworm. Thus, a 3+ assay[5] ([5] Williams et al, "J. Insect Physiol.", 11, 1185 (1965).) was obtained after injection of 25 μg into 5 grams of pupae. Thus, it is clear that one or more materials of high juvenile hormone activity are formed by the reaction of crude farnesoic acid with ethanolic hydrogen chloride.

EXAMPLE 2

The procedure of Example 1 was repeated substituting other homologous alcohols for ethanol. Methanol, n-propanol and n-pentanol each produced a material having significant juvenile hormone activity although a material prepared using n-butanol was inactive at the highest dose tested (4 mg). When assayed on *polyphemus* pupae, the activities of the corresponding synthetic products were as follows:

ethanol > methanol > n-propanol > n-pentanol

EXAMPLE 3

The material formed by the treatment of crude farnesoic acid with ethanolic hydrogen chloride was studied further. The neutral fraction was separated by dissolving 1 gram of the same in 100 ml ethanol. Water was added to incipient cloudiness and the solution was neutralized with 0.1 N sodium hydroxide to a phenophthalein end-point and then partitioned between water and diethyl ether. All biological activity was recovered in the neutral (ethereal) fraction, wt. ca. 0.75 gm.

The juvenile hormone activity obtained by treatment of crude farnesoic acid with ethanolic hydrogen chloride has proven refractory to extensive purification. The active material can be eluted from a column of silicic acid ("Unisil") with mixtures of benzene and pentane, but so also is the bulk of the mixture. Attempts to separate the active material by gas-liquid chromatography have not met with success, since little activity could be recovered from the columns.

In terms of its behavior in the chromatographic procedures, the active component appears to be much less polar than the juvenile hormone of *cecropia* oil, and there is no possibility that they are identical. Likewise, the active material is much less polar than the methyl ester of 10,11-epoxyfarnesoic acid, a compound which has recently been shown to have high juvenile activity for *Tenebrio*.

EXAMPLE 4

Crude farnesoic acid was prepared as described in Example 1 above and converted to the 2-benzyl-2-thiopseudouronium salt according to the procedure of Bates et al.[6] ([6] "J. Org. Chem.", 28, 1086 (1963).) After one recrystallization, a sample of this material (m.p. 118°–122° C.) was dissolved in absolute ethanol and perfused through a column of Dowex 50 (H+ form) to obtain the free acid. The rest of the crystalline salt was recrystallized three times to obtain the pure trans,trans salt (m.p. 133.5°–134° C.). The latter was converted to the free acid by passage through Dowex 50, as just described.

Samples of the two farnesoic acid preparations were converted to ethyl esters by treatment with a diethyl ether solution of diazoethane (generated from "Ethyl Diazald"). Examination of the two products by gas-liquid chromatography showed that the first contained approximately 70 percent trans, trans- and 30 percent, cis,trans-ethyl farnesoate. The second, more highly purified material contained at least 97 percent trans, trans-ethyl farnesoate.

Both materials showed only traces of juvenile hormone activity when dissolved in propylene glycol and assayed on *polyphemus* pupae. This demonstrates that the isomeric esters of farnesoic acid have little hormonal activity.

EXAMPLE 5

Samples of the two preparations of farnesoic acid described in Example 4 were treated with ethanolic hydrogen chloride according to the procedure of Example 1. When assayed on *polyphemus* pupae, the preparation from the mixture of trans, trans and cis, trans isomers showed detectable juvenile hormone activity at the 25-μg level whereas the preparation from the pure trans,trans isomer showed high (3+) activity when tested at this same level.

These findings indicate that the hormonally active material is not ethyl farnesoate, but one of the lesser components formed by the reaction of trans,trans-farnesoic acid with ethanolic hydrogen chloride.

EXAMPLE 6

When treated with mineral acid, farnesoic acid is known to undergo a series of cyclization reactions.[7] ([7] Stork et al., "J. Am. Chem. Soc." 77, 5068 (1955)) Samples of the 2-benzyl-2-thiopseudouronium salts of α and β monocyclic farnesoic acids, as well as a dicyclofarnesoic acid (m.p. 138° C.) were converted to free acids by perfusion through Dowex 50 (H+ form) and the free acids were converted to ethyl esters by treatment with diazoethane. All of these esters were inert when subjected to biological assay.

EXAMPLE 7

The material produced by the technique of Example 1 has been shown to have high insecticidal activity on nearly all metamorphosing insects and, in most instances, high ovicidal activity. For example, the following insects have been shown to be sensitive to this material:

| Order | Species |
|---|---|
| Order Thysanura: | *Thermobia domestica* ("Firebrat") |
| Order Blattaria: | *Periplaneta americana* ("American cockroach") |
| Order Anoplura: | *Pediculus humanus* ("Human body louse") |
| Order Hemiptera: | *Rhodnius prolixus* ("Kissing bug") |
| | *Pyrrhocoris apterus* ("Linden bug") |
| | *Oncopeltus fasciatus* ("Milkweed bug") |
| Order Coleoptera: | *Tenebrio molitor* ("Meal worm") |
| | *Anthonomus grandis* ("Boll weevil") |
| Order Lepidoptera: | *Hyalophora cecropia* ("Cecropia silkworm") |
| | *Hyalophora gloveri* ("Gloveri silkworm") |
| | *Antheraea polyphemus* ("Polyphemus silkworm") |
| | *Antheraea mylitta* ("Tusseh silkworm") |
| Order Diptera: | *Aedes aegypti* ("Yellow fever mosquito") |
| | *Culex pipiens* ("Mosquito") |
| | *Drosphila virilis* ("Fruit fly") |
| Order Hymenoptera: | *Nasonia* (*Mormoniella*) *vitripennis* ("Chalcid wasp") |

Various methods of using the material of Example 1 as an insecticide or ovicide include dispersal by any of the means or vehicles conventionally utilized with DDT, such as solutions in hydrocarbon and other apolar solvents, emulsions in water plus emulsifying agents, aerosols in volatile hydrocarbons, dust impregnated with the active material and the like. The various forms of this material may be utilized by direct application to insects, by application to environmental materials, as well as by spraying, dusting and various aerosol techniques.

From the above, it will be seen that a highly hormonally active material is obtained by the treatment of farnesoic acid with alcoholic hydrogen chloride wherein the alcohol is selected from the group consisting of ethanol, methanol, n-propanol and n-pentanol. Additionally, it is shown that ethyl farnesoate itself is not hormonally active.

The exact chemical structure of the reaction product is presently unknown. One possibility is that hydrogen chloride is added across one of the double bonds of ethyl farnesoate to give the highly active compound. In support of this hypothesis it has been noted that no active material was formed when sulfuric acid was substituted for hydrogen chloride in the synthesizing procedure. However, the instant inventive concepts are not to be limited by this hypothesis.

Thus, it will now be recognized that, in the absence of any purification, the neutral material formed by the reaction of crude or purified farnesoic acid with ethanolic hydrogen chloride is about 1,000-fold more active in the *polyphemus* assay for juvenile hormone than is crude *cecropia* oil. Moreover, this synthetic material shows a far wider spectrum of activity than the *cecropia* extract.

Thus, there is herein provided a simple and reliable technique for synthesizing a material having high juvenile hormone activity which satisfies all of the aforementioned objectives, and others, including many advantages of great significance.

Since many modifications may be made of the instant inventive concepts, the preceding is intended to merely be illustrative and not in any way limiting.

What is claimed is:

1. A method for synthesizing a material having juvenile hormone activity comprising the steps of dissolving one gram of farnesoic acid in 100 milliliters of an alcohol selected from the group consisting of ethanol, methanol, n-propanol and n-pentanol, chilling the resultant solution to 0° Centigrade, passing a stream of hydrogen chloride gas through said solution for 5 minutes, raising the temperature of said solution to ambient temperature, eliminating the solvent in vacuo while the temperature gradually rises to 50° C, rinsing the resultant material with small volumes of benzene after elimination of the solvent, washing said material with water to remove residual traces of hydrogen chloride, collecting the resultant benzene phase, and reducing said benzene phase to dryness.

2. The method of claim 1 wherein the alcohol is ethanol.
3. The method of claim 1 wherein said farnesoic acid is crude farnesoic acid.
4. The method of claim 1 wherein said farnesoic acid is a mixture of trans, trans- and cis, trans-farnesoic acids.
5. The method of claim 1 wherein said farnesoic acid is substantially pure trans, trans-farnesoic acid.
6. The product of the process of claim 1.

* * * * *